US010205569B2

(12) United States Patent
Kim et al.

(10) Patent No.: US 10,205,569 B2
(45) Date of Patent: Feb. 12, 2019

(54) METHOD AND USER EQUIPMENT FOR RECEIVING DOWNLINK SIGNALS, AND METHOD AND BASE STATION FOR TRANSMITTING DOWNLINK SIGNALS

(75) Inventors: Hakseong Kim, Anyang-si (KR); Hanbyul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 487 days.

(21) Appl. No.: 14/241,371

(22) PCT Filed: Aug. 27, 2012

(86) PCT No.: PCT/KR2012/006834
§ 371 (c)(1),
(2), (4) Date: Feb. 26, 2014

(87) PCT Pub. No.: WO2013/032202
PCT Pub. Date: Mar. 7, 2013

(65) Prior Publication Data
US 2014/0211739 A1    Jul. 31, 2014

Related U.S. Application Data

(60) Provisional application No. 61/527,621, filed on Aug. 26, 2011.

(51) Int. Cl.
H04L 5/00       (2006.01)
H04L 27/26      (2006.01)
H04W 72/04      (2009.01)

(52) U.S. Cl.
CPC .......... H04L 5/0037 (2013.01); H04L 5/0053 (2013.01); H04L 5/0094 (2013.01);
(Continued)

(58) Field of Classification Search
USPC ........................................ 370/329
See application file for complete search history.

(56) References Cited

U.S. PATENT DOCUMENTS

| 2009/0046605 A1* | 2/2009 | Gao ................. H04W 72/14 370/280 |
| 2010/0067512 A1* | 3/2010 | Nam ................. H04B 7/068 370/342 |

(Continued)

FOREIGN PATENT DOCUMENTS

| KR | 10-2011-0068807 | 6/2011 |
| WO | 2011/071317 | 6/2011 |

(Continued)

OTHER PUBLICATIONS

International Publication No. WO2011159132 A2.*

(Continued)

*Primary Examiner* — Gregory B Sefcheck
*Assistant Examiner* — Majid Esmaeilian
(74) *Attorney, Agent, or Firm* — Lee, Hong, Degerman, Kang & Waimey PC

(57) ABSTRACT

The present invention relates to methods and devices for transmitting/receiving downlink signals in a wireless communication system. The methods and devices according to the present invention receive a downlink grant for user equipment (referred to hereinafter as a first downlink grant) at a first of a plurality of resource units in a given resource region from a base station; and detect an uplink grant at a second of the plurality of resource units if resource assignment information in the first downlink grant has a first value, and detect downlink data at the resource unit if the resource assignment information has a second value.

12 Claims, 17 Drawing Sheets

(52) U.S. Cl.
CPC ....... *H04L 27/2602* (2013.01); *H04W 72/042* (2013.01); *H04L 27/2647* (2013.01)

(56) References Cited

U.S. PATENT DOCUMENTS

| | | | |
|---|---|---|---|
| 2010/0182968 A1* | 7/2010 | Ojala | H04W 52/54 370/329 |
| 2010/0195599 A1 | 8/2010 | Zhang et al. | |
| 2010/0195748 A1* | 8/2010 | Nam | H04J 11/0069 375/260 |
| 2010/0323709 A1* | 12/2010 | Nam | H04L 5/0094 455/450 |
| 2011/0070845 A1* | 3/2011 | Chen | H04L 5/001 455/91 |
| 2011/0170496 A1* | 7/2011 | Fong | H04L 5/0053 370/329 |
| 2011/0176634 A1* | 7/2011 | Yoon | H04L 5/0023 375/295 |
| 2011/0194551 A1* | 8/2011 | Lee | H04B 7/0626 370/342 |
| 2011/0205951 A1* | 8/2011 | Lee | H04B 7/155 370/312 |
| 2011/0222485 A1* | 9/2011 | Nangia | H04B 7/0452 370/329 |
| 2011/0228718 A1* | 9/2011 | Noh | H04L 5/0051 370/312 |
| 2011/0228735 A1* | 9/2011 | Lee | H04L 5/0051 370/329 |
| 2011/0255485 A1* | 10/2011 | Chen | H04W 72/0453 370/329 |
| 2011/0268064 A1* | 11/2011 | Chen | H04L 5/003 370/329 |
| 2011/0274064 A1* | 11/2011 | Luo | H04W 52/146 370/329 |
| 2012/0039280 A1* | 2/2012 | Chen | H04L 1/1861 370/329 |
| 2012/0176957 A1* | 7/2012 | Chen | H04B 7/155 370/315 |
| 2012/0294251 A1* | 11/2012 | Seo | H04L 5/0053 370/329 |
| 2012/0320847 A1* | 12/2012 | Nam | H04W 72/0406 370/329 |
| 2013/0003664 A1* | 1/2013 | Frenne | H04W 72/1289 370/329 |
| 2013/0051310 A1* | 2/2013 | Kim | H04L 5/0023 370/315 |
| 2013/0051355 A1* | 2/2013 | Hong | H04J 11/0073 370/329 |
| 2013/0100917 A1* | 4/2013 | Seo | H04W 72/1284 370/329 |
| 2013/0114554 A1* | 5/2013 | Yang | H04W 24/10 370/329 |

FOREIGN PATENT DOCUMENTS

| | | | |
|---|---|---|---|
| WO | 2011/071341 | 6/2011 | |
| WO | WO 2011159132 A2 * | 12/2011 | .......... H03M 13/271 |

OTHER PUBLICATIONS

PCT International Application No. PCT/KR2012/006834, Written Opinion of the International Searching Authority dated Feb. 21, 2013, 14 pages.

* cited by examiner (a)                    (b)

FIG. 14
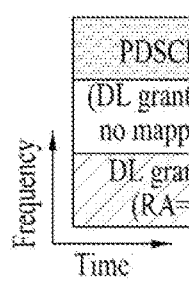 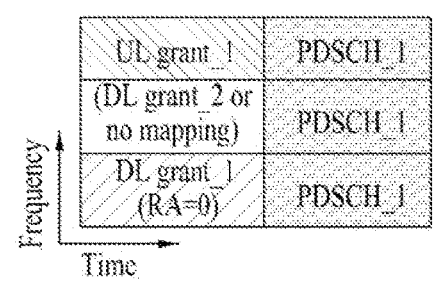
(a)                    (b)

METHOD AND USER EQUIPMENT FOR RECEIVING DOWNLINK SIGNALS, AND METHOD AND BASE STATION FOR TRANSMITTING DOWNLINK SIGNALS

CROSS-REFERENCE TO RELATED APPLICATIONS

This application is the National Stage filing under 35 U.S.C. 371 of International Application No. PCT/KR2012/006834, filed on Aug. 27, 2012, which claims the benefit of U.S. Provisional Application Serial No. 61/527,621, filed on Aug. 26, 2011, the contents of which are all hereby incorporated by reference herein in their entirety.

TECHNICAL FIELD

The present invention relates to a wireless communication system. Specifically, the present invention relates to a method and apparatus for transmitting a downlink signal and a method and apparatus for receiving a downlink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A node refers to a fixed point capable of transmitting/receiving a radio signal to/from a user equipment through one or more antennas. A communication system including high-density nodes may provide a better communication service to the user through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of downlink data and uplink control information that the BS should transmit to the UEs increases. Since the amount of resources available to the BS for communication with the UE(s) is finite, a new method in which the BS efficiently transmits downlink data and/or downlink control information using the finite radio resources is needed.

Accordingly, the present invention provides a method and apparatus for efficiently transmitting/receiving a downlink signal.

The technical objects that can be achieved through the present invention are not limited to what has been particularly described hereinabove and other technical objects not described herein will be more clearly understood by persons skilled in the art from the following detailed description.

Technical Solutions

As an aspect of the present invention, provided herein is a method for receiving a downlink signal from a user equipment by a base station in a wireless communication system, including receiving a downlink grant for the user equipment (hereinafter, a first downlink grant) from the base station on a first resource unit among a plurality of resource units in a predetermined resource region; and detecting an uplink grant on a second resource unit among the resource units when resource assignment information in the first downlink grant has a first value and detecting downlink data on the resource unit when the resource assignment information has a second value.

As another aspect of the present invention, provided herein is a user equipment for receiving a downlink signal from a base station in a wireless communication system, including a radio frequency (RF) unit configured to transmit/receive a signal; and a processor configured to control the RF unit, wherein the processor controls the RF unit to receive a downlink grant for the user equipment (hereinafter, a first downlink grant) from the base station on a first resource unit among a plurality of resource units in a predetermined resource region; and the processor detects an uplink grant on a second resource unit among the resource units when resource assignment information in the first downlink grant has a first value and detects downlink data on the resource unit when the resource assignment information has a second value.

As still another aspect of the present invention, provided herein is a method for transmitting a downlink signal to a user equipment by a base station in a wireless communication system, including transmitting a downlink grant for the user equipment (hereinafter, a first downlink grant) to the user equipment on a first resource unit among a plurality of resource units in a predetermined resource region; and transmitting an uplink grant or downlink data to the user equipment on a second resource unit among the resource units, wherein the first downlink grant includes assignment information having a first value when the uplink grant is transmitted on the second resource unit and the first downlink grant includes assignment information having a second value when the downlink data is transmitted on the second resource unit.

As a further aspect of the present invention, provided herein is a base station for receiving a downlink signal from a user equipment in a wireless communication system, including a radio frequency (RF) unit configured to transmit/receive a signal; and a processor configured to control the RF unit, wherein the processor controls the RF unit to transmit a downlink grant for the user equipment (hereinafter, a first downlink grant) to the user equipment on a first resource unit among a plurality of resource units in a predetermined resource region and controls the RF unit to transmit an uplink grant or downlink data to the user equipment on a second resource unit among the resource units, and wherein the first downlink grant includes assignment information having a first value when the uplink grant is transmitted on the second resource unit and the first downlink grant includes assignment information having a second value when the downlink data is transmitted on the second resource unit.

In each aspect of the present invention, additional information indicating whether a downlink grant of another user equipment (hereinafter, a second downlink grant) is present may be transmitted from the base station to the user equipment.

In each aspect of the present invention, the downlink data may be transmitted/received on a third resource unit among the resource units when additional information indicating whether a downlink grant of another user equipment (hereinafter, a second downlink grant) is present indicates that the second downlink grant is not present.

In each aspect of the present invention, the downlink data may not be transmitted/received on the third resource unit when additional information indicating whether or not a downlink grant of another user equipment (hereinafter, a second downlink grant) is present indicates that the second downlink grant is not present.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, efficiency of downlink resource use is enhanced.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIGS. 14 and 15 illustrate examples of resource assignment according to still another embodiment of the present invention.

BEST MODE FOR CARRYING OUT THE INVENTION

Figure 1:
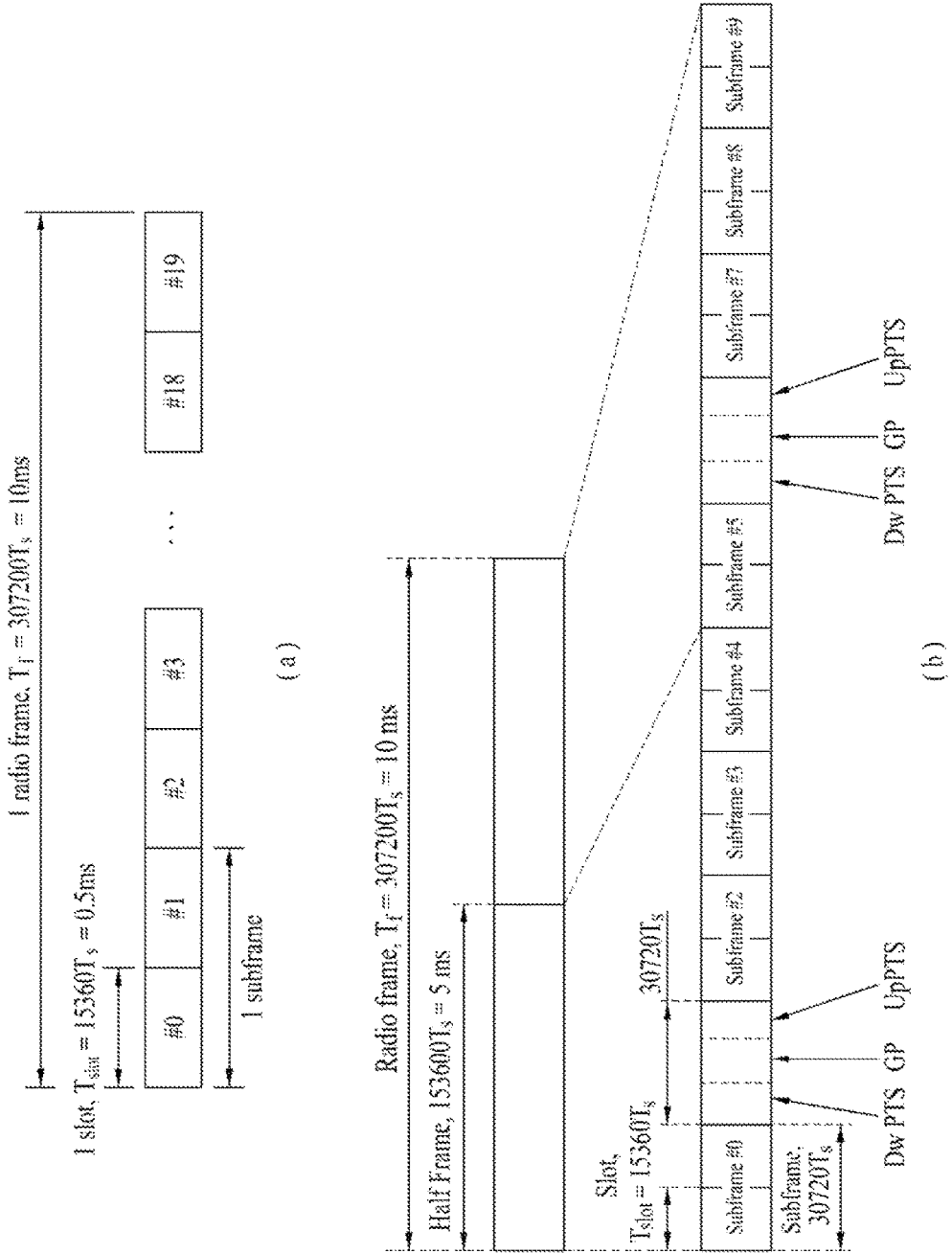
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio link. At least one antenna is installed per node. The antenna may mean a physical antenna, an antenna port, a virtual antenna, or an antenna group. A node may be referred to as a point. Unlike a conventional centralized antenna system (CAS) (i.e. a single-node system) including antennas which converge upon an eNB and are controlled by one eNB controller, a multi-node system includes a plurality of nodes separated from one another by a predetermined distance or more. The plural nodes may be managed by one or more eNBs or eNB controllers for controlling operation thereof or scheduling data transmission/reception therethrough. Each node may be connected to an eNB or eNB controller for managing the node through a cable or a dedicated line. In the multi-node system, the same cell identifier (ID) or different cell IDs may be used to transmit/receive signals to/from a plurality of nodes. If the nodes have the same cell ID, each of the nodes operates as a partial antenna group of one cell. If the nodes have different cell IDs in the multi-node system, the multi-node system may be regarded as a multi-cell (e.g.

a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

Meanwhile, in the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using channel state information-reference signal(s) (CSI-RS(s)) transmitted on a CSI-RS resource allocated to the specific node by antenna port(s) of the specific node. Generally, neighboring nodes transmit CSI-RS resources on orthogonal CSI-RS resources. When CSI-RS resources are orthogonal, this mean that CSI-RS resources have different subframe configurations and/or CSI-RS sequences, which specify subframes to which CSI-RSs are allocated, according to CSI-RS resource configurations, subframe offsets and transmission periods, etc., which specify symbols and subcarriers carrying the CSI RSs.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or Resource Elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of an eNB is conceptually identical to downlink data/DCI transmission on PDCCH/PCFICH/PHICH/PDSCH, respectively.

In the present invention, a time resource refers to a radio resource defined in the time domain, a frequency resource refers to a radio resource defined in the frequency domain, and a spatial resource refers to a radio resource defined in the spatial domain. Time resources may be distinguished by an orthogonal frequency division multiplexing (OFDM)/single carrier frequency division multiplexing (SC-FDM) symbol, a slot, a subframe, or a frame and frequency resources may be distinguished by a subcarrier, a resource block (RB), a resource block group (RBG), or a carrier. Spatial resources may be distinguished by a layer or an antenna port.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
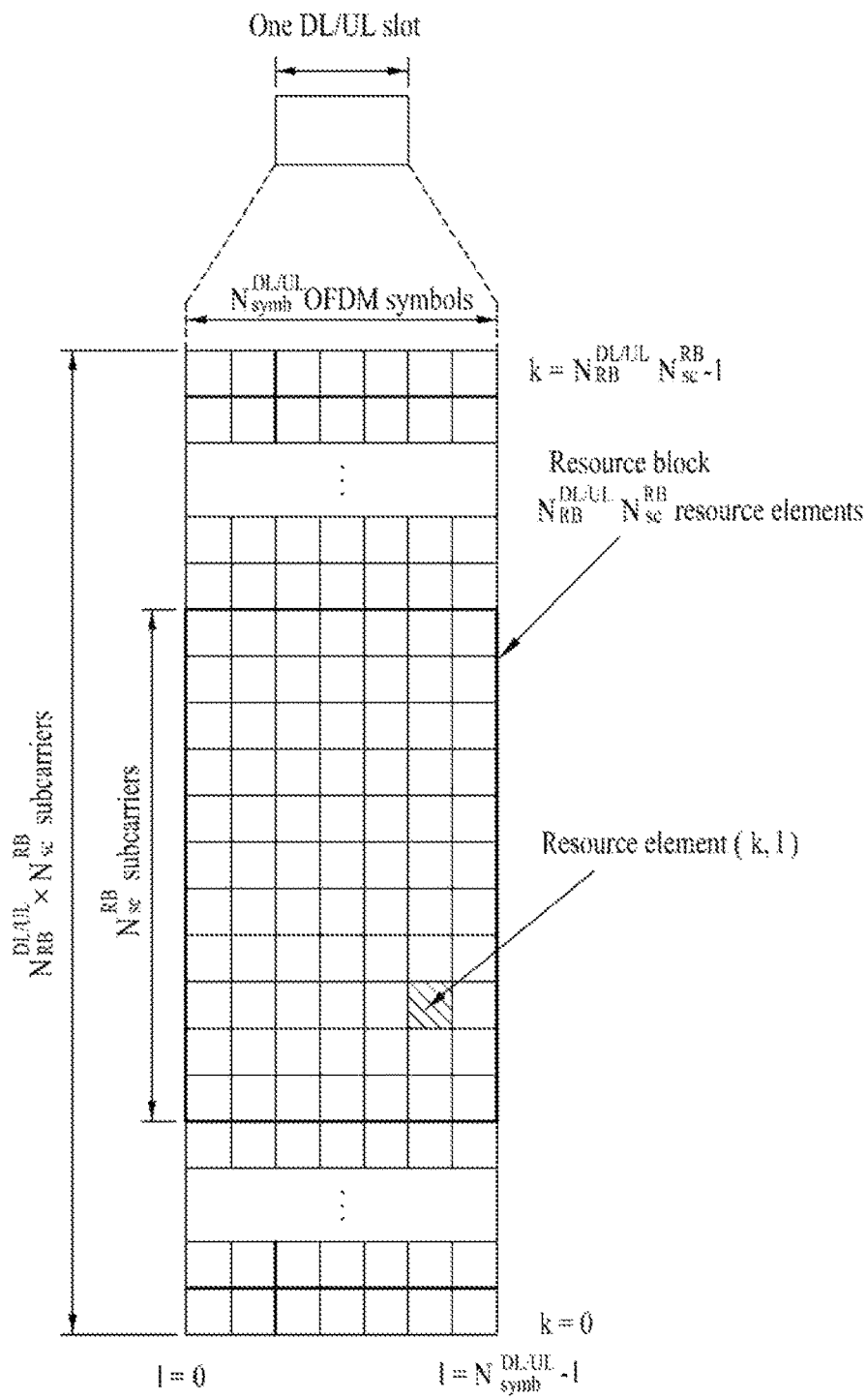
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
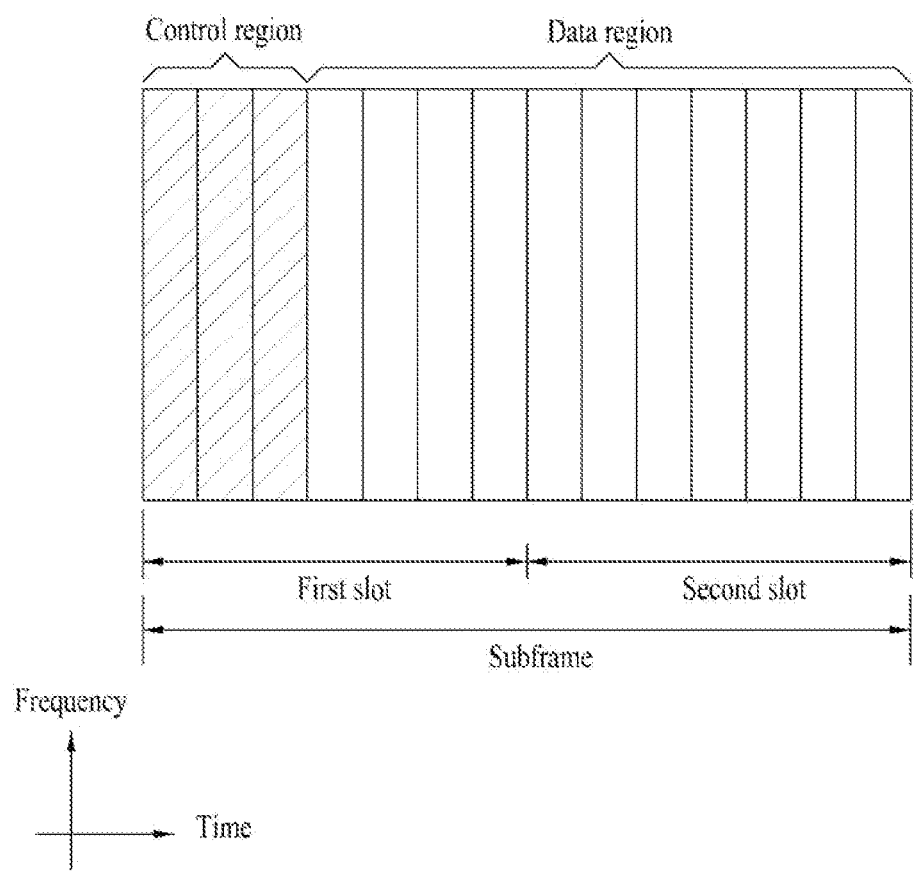
FIG. 3 illustrates the structure of a DL subframe used in a 3GPP ($3^{rd}$ Generation Partnership Project) LTE (Long Term Evolution)/LTE-A (Advanced) system.

FIG. 3 illustrates the structure of a DL subframe used in a 3GPP LTE/LTE-A system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for an uplink, and formats 1, 1A, 1B, 1C, 1D, 2, 2A, 3, and 3A are defined for a downlink. Combination selected from control information such as a hopping flag, RB allocation, modulation coding scheme (MCS), redundancy version (RV), new data indicator (NDI), transmit power control (TPC), cyclic shift, cyclic shift demodulation reference signal (DMRS), UL index, channel quality information (CQI) request, DL assignment index, HARQ process number, transmitted precoding matrix indicator (TPMI), precoding matrix indicator (PMI) information is transmitted to the UE as the downlink control information.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. In a 3GPP LTE system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. In the 3GPP LTE/LTE-A system, SSs for respective PDCCH formats may have different sizes and a dedicated SS and a common SS are defined. The dedicated SS is a UE-specific SS and is configured for each individual UE. The common SS is configured for a plurality of UEs. Table 3 shows aggregation levels for defining SSs.

TABLE 3

| Type | Search Space Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to CCE aggregation levels. An eNB transmits an actual PDCCH (DCI) on a PDCCH candidate in an SS and a UE monitors the SS to detect the PDCCH (DCI). Here, monitoring refers to attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

An eNB may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
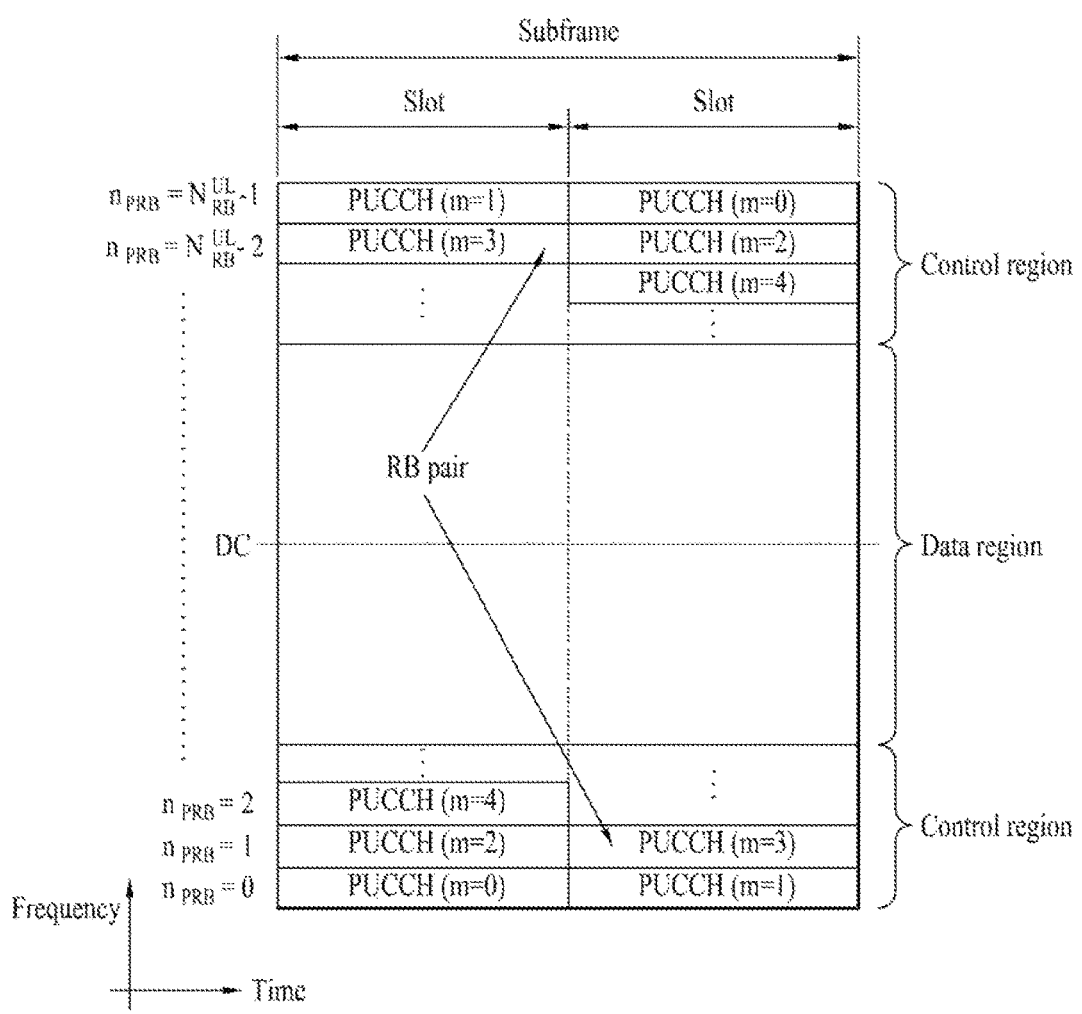
FIG. 4 illustrates the structure of a UL subframe used in a 3GPP LTE/LTE-A system.

FIG. 4 illustrates the structure of a UL subframe used in a 3GPP LTE/LTE-A system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to deliver user data. A PUSCH may be transmitted together with a DMRS which is an RS for demodulation of user data transmitted on a PUSCH. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted in a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of the PUCCH and the PUSCH may be indicated by higher layers.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarrier.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

Hereinafter, the mapping of RBs is described. A physical resource block (PRB) and a virtual resource block (VRB) are defined. A PRB is identical to the RB illustrated in FIG. 2. That is, the PRB is defined as $N^{DL}_{symb}$ consecutive OFDM symbols in the time domain and $N^{RB}_{sc}$ consecutive subcarriers in the frequency domain. The PRB is numbered 0 to $N^{DL}_{RB}-1$ in the frequency domain. The relationship between a PRB number $n_{PRB}$ and an RE (k, l) in a slot is as follows.

$$n_{PRB} = \left\lfloor \frac{k}{N^{RB}_{sc}} \right\rfloor \quad \text{Equation 1}$$

A VRB is a type of logical resource allocation unit introduced for resource allocation. The VRB is equal in size to the PRB. The VRB is classified into a localized VRB (LVRB) and a distributed VRB (DVRB) according to a VRB-to-PRB mapping scheme. Regardless of VRB type, a pair of RBs is allocated over two slots of a subframe by a single VRB number $n_{VRB}$. Two PRBs, which are respectively located in two slots of a subframe and have the same VRB number, are called a VRB pair.

Figure 5:
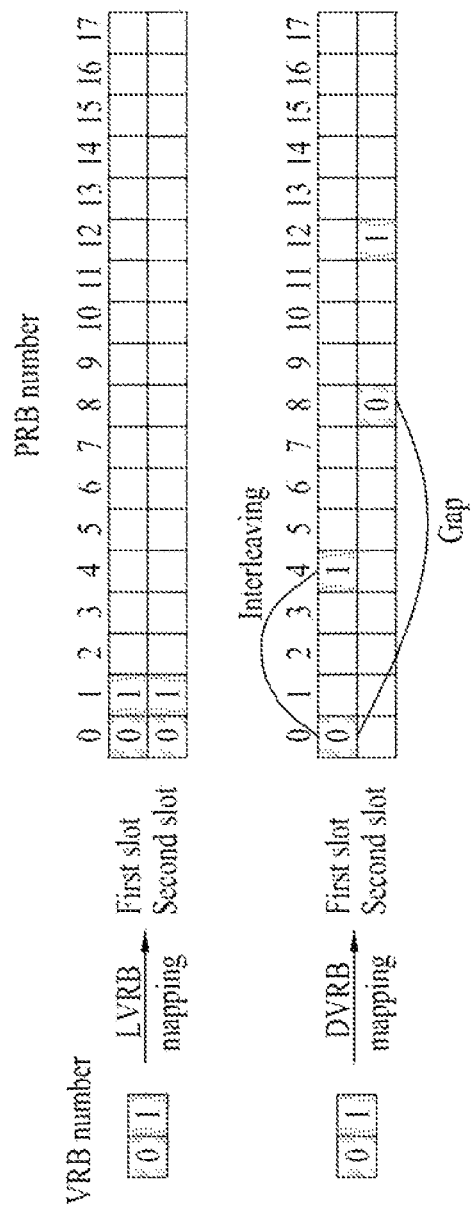
FIG. 5 illustrates a method of mapping a virtual resource block (VRB) to a physical resource block (PRB).

FIG. 5 illustrates a method of mapping a VRB to a PRB.

Referring to FIG. 5, LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Specifically, the DVRBs may be mapped to the PRBs as shown in Table 4. Table 4 illustrates RB gap values.

TABLE 4

| System BW ($N^{DL}_{RB}$) | 1st Gap ($N_{gap,1}$) | 2nd Gap ($N_{gap,2}$) |
|---|---|---|
| 6-10 | $\lceil N^{DL}_{RB}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g. PRB unit) when VRBs of the same number are mapped to PRBs of the first and second slots. If $6 \leq N^{DL}_{RB} \leq 49$, only one gap is defined ($N_{gap}=N_{gap,1}$). If $50 \leq N^{DL}_{RB} \leq 110$, two gap values $N_{gap,1}$ and $N_{gap,2}$ are defined. $N_{gap}=N_{gap,1}$ or $N_{gap}=N_{gap,2}$ is signaled through DL scheduling. DVRBs are numbered from 0 to $N^{DL}_{VRB}-1$. For $N_{gap}=N_{gap,1}$, $N^{DL}_{VRB}=N^{DL}_{VRB,gap1}=2 \cdot \min(N_{gap}, N^{DL}_{RB}-N_{gap})$. For $N_{gap}=N_{gap,2}$, $N^{DL}_{VRB}=N^{DL}_{VRB,gap2}=\text{floor}(N^{DL}_{RB}/2 \cdot N_{gap}) \cdot 2 \cdot N_{gap}$. Here, min(A, B) indicates the smaller of A and B and floor($\chi$) indicates the largest integer not greater than x.

Consecutive $N^{\sim DL}_{VRB}$ VRB numbers constitute a unit for VRB number interleaving. If $N_{gap}=N_{gap,1}$, then $N^{\sim DL}_{VRB}=N^{DL}_{VRB}$ and if $N_{gap}=N_{gap,2}$, then $N^{\sim DL}_{VRB}=2N_{gap}$. VRB number interleaving of each interleaving unit may be performed using four columns and $N_{row}$ rows. $N_{row}=\{\text{ceil}(N^{\sim DL}_{VRB}/(4P))\} \cdot P$ and P is the size of an RBG. Here, ceil denotes a ceiling function and ceil(x) is a minimum integer not smaller than $\chi$. An RBG is defined as P consecutive RBs. VRB numbers are written in a matrix on a row-by-row basis and are read on a column-by-column basis. $N_{null}$ null values are inserted into the last $N_{null}/2$ row of the second and fourth columns and $N_{null}=N_{row}-N^{\sim DL}_{VRB}$. The null values are ignored upon reading.

Figure 6:
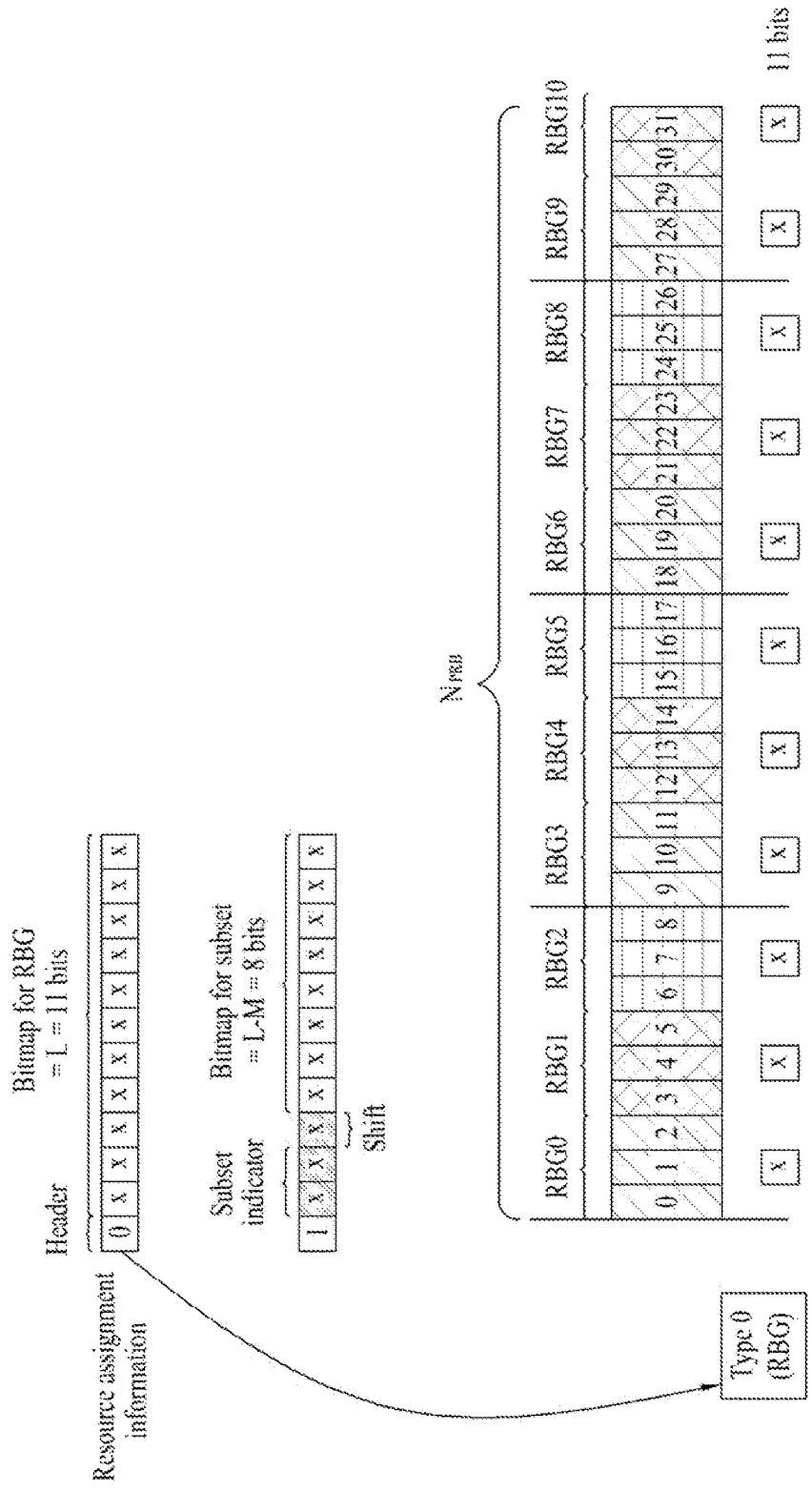
FIGS. 6, 7, and 8 illustrate control information formats for Type 0 resource allocation (RA), Type 1 RA, and Type 2 RA and examples of resource allocation thereof, respectively.
Figure 7:
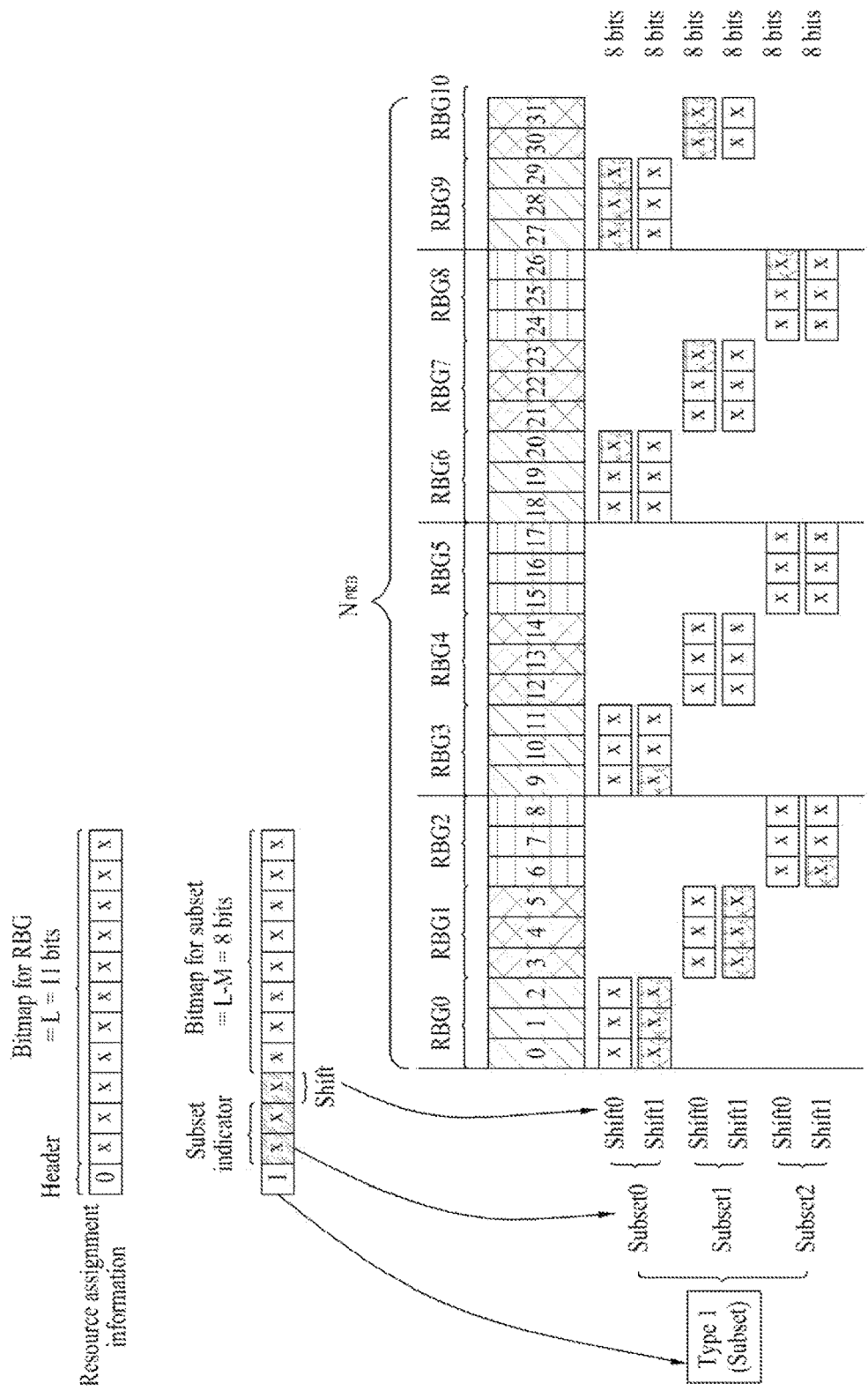
Figure 8:
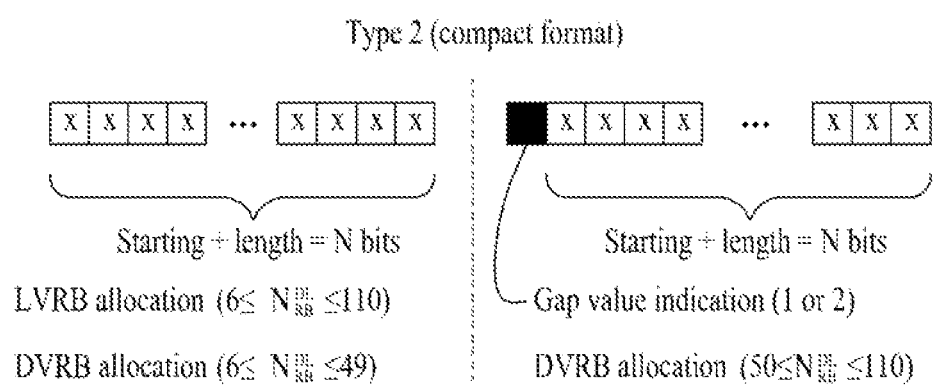

Hereinafter, resource allocation defined in legacy LTE will be described. FIGS. 6, 7, and 8 illustrate control information formats for Type 0 resource allocation (RA), Type 1 RA, and Type 2 RA and examples of resource allocation thereof, respectively.

A UE interprets a resource allocation field based on a detected PDCCH DCI format. The resource allocation field in each PDCCH includes two parts: a resource allocation header field and actual RB assignment information. PDCCH DCI formats 1, 2, and 2A for Type 0 and Type 1 RA have the same format and are distinguished by a single-bit resource allocation header field which is present according to DL system bandwidth. Specifically, Type 0 RA is indicated by 0 and Type 1 RA is indicated by 1. While PDCCH DCI formats 1, 2, and 2A are used for Type 0 or Type 1 RA, PDCCH formats 1A, 1B, 1C, and 1D are used for Type 2 RA. A PDCCH DCI format having Type 2 RA does not include a resource allocation header field. The resource allocation field indicates a PRB set of the first slot. Since slot hopping does not exist between the first slot and the second slot in the case of RA Type 0, Type 1, and Type 2-LVRB, which will be described later, the same PRB set as in the first slot is allocated in the second slot (i.e. PRB index (of the first slot)=PRB index (of the second slot)). Meanwhile, in the case of RA Type 2-DVRB, if the PRB set of the first slot is given, the PRB set of the second slot is determined by a slot hopping rule.

Referring to FIG. 6, in Type 0 RA, RB assignment information includes a bitmap indicating an RBG allocated to a UE. The RBG is a set of consecutive PRBs. The size of the RBG, P, depends upon system bandwidth as shown in Table 5.

TABLE 5

| System Bandwidth $N^{DL}_{RB}$ | RBG Size (P) |
|---|---|
| ≤10 | 1 |
| 11-26 | 2 |
| 27-63 | 3 |
| 64-110 | 4 |

In DL system bandwidth having $N^{DL}_{RB}$ PRBs, a total number of RBGs, $N_{RBG}$, is given by $N_{RBG}=\text{ceil}(N^{DL}_{RB}/P)$, the size of floor($N^{DL}_{RB}/P$) RBGs is P, and the size of one RBG is $N^{DL}_{RB}-P \cdot \text{floor}(N^{DL}_{RB}/P)$ when $N^{DL}_{RB}$ mod P>0. Here, mod indicates a modulo operation. The size of a bitmap is $N_{RBG}$ and each bit corresponds to one RBG. All RBGs are indexed 0 to $N_{RBG}-1$ in a frequency increase direction and RBG 0 to RBG $N_{RBG}-1$ are mapped from a most significant bit (MSB) to a least significant bit (LSB) of the bitmap.

Referring to FIG. 7, in Type 1 RA, RB assignment information having the size of $N_{RBG}$ informs a scheduled UE of resources in an RBG subset in PRB units. An RBG subset p (0≤p<P) consists of every P-th RBG starting from an RBG p. The RB assignment information includes three fields. The first field has ceil{log$_2$(P)} bits and indicates an RBG subset selected from among P RBG subsets. The second field has one bit and indicates shift of a resource assignment span within a subset. The shift is triggered when a bit value is 1 and is not triggered when a bit value is not 1. The third field includes a bitmap and each bit indicates one PRB within a selected RBG set. The size of a bitmap part used to indicate a PRB within the selected RBG subset is $N^{TYPE1}_{RB}$ and is defined as follows.

$$N_{RB}^{TYPE1} = \lceil N_{RB}^{DL}/P \rceil - \lceil \log_2(P) \rceil - 1 \quad \text{Equation 2}$$

An addressable PRB number in a selected RBG subset may start from an offset $\Delta_{shift}(p)$ from the smallest PRB number within the selected RBG subset and may be mapped to the MSB of a bitmap. The offset is expressed by the number of PRBs and is applied within the selected RBG subset. When the bit value within the second field for shift of the resource assignment span is set to 0, an offset for an RBG subset p is given as $\Delta_{shift}(p)=0$. In the other cases, the offset for the RBG subset p is given as $\Delta_{shift}(p)=N^{RBGsubset}_{RB}(p)-N^{TYPE1}_{RB}$. $N^{RBGsubset}_{RB}(p)$ denotes the number of PRBs within the RBG subset p and may be obtained as follows.

$$N_{RB}^{RBGsubject}(p) = \quad \text{Equation 3}$$

$$\begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1) \bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

Figure 9:
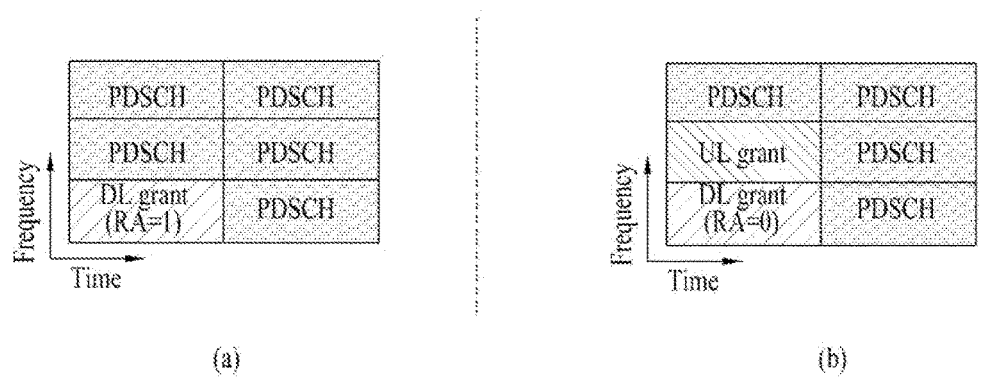
FIGS. 9 and 10 illustrate examples of resource assignment according to an embodiment of the present invention.

Referring to FIG. 9, in Type 2 RA, RB assignment information indicates a set of LVRBs or DVRBs consecutively allocated to a scheduled UE. If resource assignment is signaled in PDCCH DCI format 1A, 1B, or 1D, a 1-bit flag indicates whether an LVRB or DVRB is allocated (e.g. 0 denotes LVRB assignment and 1 denotes DVRB assignment). In contrast, if resource assignment is signaled in PDCCH DCI format 1C, only a DVRB is always allocated. A Type 2 RA field includes a resource indication value (RIV) and the RIV corresponds to a start RB $RB_{start}$ and length. The length denotes the number of virtually and consecutively allocated RBs.

To improve system performance, introduction of an RRH has been discussed. In addition, in a carrier aggregation situation, a plurality of carriers may be configured for one UE. Each aggregated carrier is called a component carrier (CC) and a CC configured for the UE is called a serving CC. When a plurality of CCs is configured for the UE, a method for transmitting a UL/DL grant for other CCs on a serving CC having good channel status has been discussed. If a CC carrying the UL/DL grant, which is scheduling information, is different from a CC on which UL/DL transmission corresponding to the UL/DL grant is performed, this is referred to as cross-carrier scheduling. If RRH technology and cross-carrier scheduling technology are introduced, the amount of PDCCHs that the BS should transmit is gradually increased. However, since the size of a control region to which the PDCCH can be transmitted is the same as that of the conventional art, PDCCH transmission acts as a system performance bottleneck. Accordingly, in order to prevent PDCCH transmission from restricting system performance, PDCCH transmission using a PDSCH region of a DL subframe has been discussed. Referring to FIG. 3, a PDCCH based on legacy 3GPP LTE(-A) standard may be allocated to a PDCCH region of a DL subframe and the PDCCH may be additionally or separately allocated using some resources of the PDSCH region. While a legacy PDCCH transmitted in the PDCCH region is transmitted using resources over a wide frequency bandwidth in the frequency domain, the PDCCH transmitted in the PDSCH region is usually transmitted using only a narrow frequency bandwidth. Hereinafter, a PDCCH which is transmitted in rear OFDM symbols (PDSCH region) of a DL subframe will be referred to as an embedded PDCCH (e-PDCCH) in order to distinguish the PDCCH from a legacy PDCCH transmitted in front OFDM symbol(s) of the DL subframe. The e-PDCCH is also called an enhanced PDCCH (E-PDCCH) or an advanced PDCCH (A-PDCCH). A PDSCH/PUSCH scheduled by the e-PDCCH may be referred to as an e-PDSCH/e-PUSCH.

According to 3GPP TS 36.216 regarding a relay operation, a relay PDCCH (R-PDCCH) carries DCI in a link between an eNB and a relay node (RN) (hereinafter, an eNB-RN link (backhaul)). That is, the R-PDCCH carries DCI for RNs. Unlike a normal 3GPP LTE PDCCH, the R-PDCCH is transmitted/received in a PDSCH region and a DL R-PDCCH (i.e. R-PDCCH carrying a DL grant) and a UL R-PDCCH (i.e. R-PDCCH carrying a UL grant) are transmitted/received in the first and second slots, respectively. The R-PDCCH may be regarded as a type of e-PDCCH in that the R-PDCCH is positioned in the PDSCH region.

Hereinbelow, the present invention provides the structure of an e-PDCCH proposed to overcome the limitations of a legacy PDCCH and a resource assignment method using the same. The e-PDCCH is largely classified into two categories: DL grant and UL grant. The DL grant carries information for a time/frequency/spatial resource of a PDSCH on which data that a UE should receive is transmitted and carries information for performing decoding. The UL grant carries information for a time/frequency/spatial resource of a PUSCH on which data that a UE should transmit on UL is transmitted and carries information for performing decoding. When the DL grant is present in a resource region allocated to a UE, (a) data for the UE or a UE group including the UE, (b) a UL grant for the UE, (c) a DL grant for another UE, and/or (d) a UL grant for another UE may be present in the allocated resource region. In order for a UE to correctly decode a signal received in a resource region allocated thereto, the UE should discern which signal of (a) to (d) is present in the allocated resource region. This is because a signal restoration process varies with a type of signal. For example, if the UE is not aware of which signal of (a) to (d) is received in the resource region allocated thereto, the UE may process a UL grant therefor or a DL/UL grant for another UE as data or, conversely, may process data as DL control information. Accordingly, the present invention proposes an implicit resource assignment method for a single layer or multiple layers, suitable for an e-PDCCH. Embodiments of the present invention will be described below with reference to FIGS. 9 to 15.

In FIGS. 9 to 15, a time-frequency region indicated in the time domain and the frequency domain corresponds to a DL resource region allocated to one UE and the size thereof may be variously configured. For example, as described with reference to FIGS. 5 to 8, resources may be allocated to the UE in the unit of a PRB pair or an RBG. In this case, although an e-PDCCH DL/UL grant of the present invention may occupy one RB in the allocated PRB pair or RBG, the e-PDCCH DL/UL grant may be configured to occupy a less resource unit than an RB. As an example, the e-PDCCH DL/UL grant may use REs of a number corresponding to ½ or ¼ of an RB. Moreover, instead of 12 localized or consecutive subcarriers and one slot, an RB occupied by the e-PDCCH DL/UL grant may have a structure defined as X subcarriers (where X is a positive integer other than 12) and Y OFDM symbols (where Y is a positive integer other than 6 or 7) or a structure defined as distributed or non-consecutive subcarriers and/or distributed/non-consecutive OFDM symbols. Hereinafter, the embodiments of the present invention will be described by referring to a unit of resources occupied by an e-PDCCH carrying a DL/UL grant as a resource unit. Accordingly, for example, when an e-PDCCH occupies one RB, one RB corresponds to one resource unit and, when an e-PDCCH occupies four REs, four REs correspond to one resource unit.

Meanwhile, for convenience of description, the embodiments of the present invention are described in FIGS. 9 to 15 under the assumption that a predetermined resource region allocated to a UE corresponds to one RBG. Referring to Table 5, an RBG is composed of one or more consecutive RBs in the frequency domain. Assuming that an e-PDCCH occupies one RB and a resource region allocated to the UE is an RBG, FIGS. 9 to 15 may be interpreted as the case in which the RBG includes three consecutive RBs. In this case, the RB means a PRB or a VRB.

In FIGS. 9 to 15, a predetermined resource region allocated to a UE or UE group is divided into 6 small regions and one UL grant is present in the predetermined resource region. However, the predetermined resource region allocated to the UE or UE group may be divided in a different form from the regions shown in FIGS. 9 to 15 and a UL grant and/or a DL grant may be located in the predetermined resource region in forms different from those shown in FIGS. 9 to 15.

It is assumed in FIGS. 9 to 15 that the UE is aware of a region in which an e-PDCCH carrying a DL grant thereof is detected among PDSCH regions. A DL grant transmitted through a PDCCH or a higher-layer signal may carry information regarding an SS for the e-PDCCH of the UE. A predetermined DL resource region (e.g. an RBG) is allocated to the UE by using the DL grant transmitted through the PDCCH or by higher-layer signaling and a specific resource unit among resource units of the allocated resource region (e.g. a resource unit having the lowest index among resources units in an RBG) may be predefined as an e-PDCCH SS carrying the DL grant.

Figure 10:
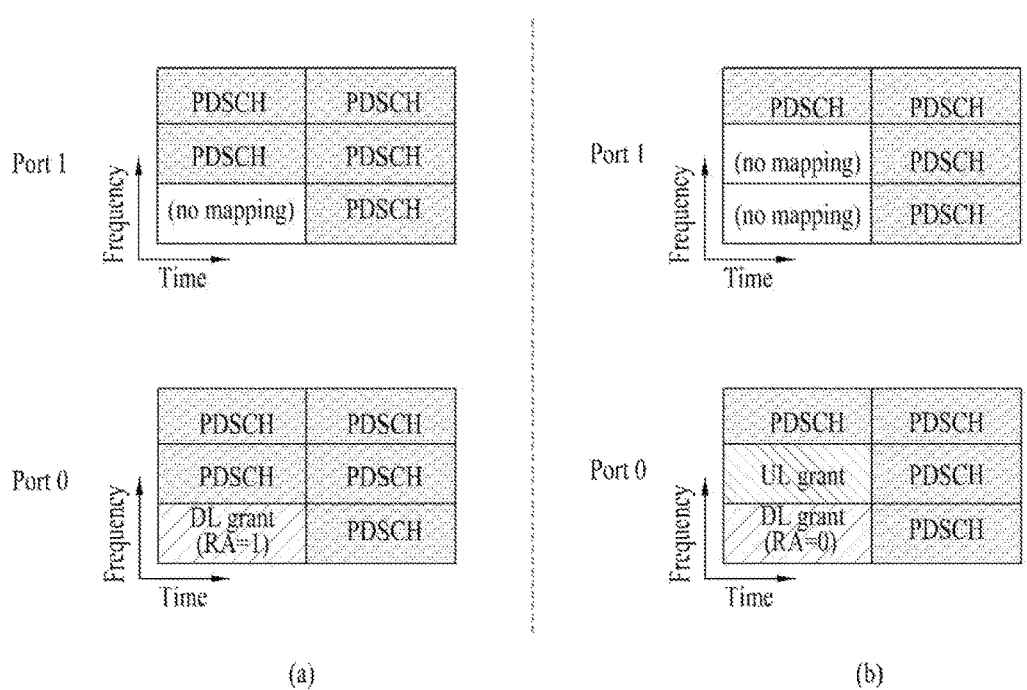

FIG. 9 and FIG. 10 illustrate examples of resource assignment according to an embodiment of the present invention.

According to an embodiment of the present invention, one bit of RA information (hereinafter, an RA bit) included in a DL grant is interpreted as a signal indicating that (1) PDSCHs have been allocated to regions except for a resource region occupied by the DL grant among allocated resource regions or (2) PDSCHs have been allocated to regions except for a resource region occupied by the DL grant and a resource region pre-designated to be occupied by a UL grant. Here, although the location of the UL grant may be a resource unit (e.g. PRB) adjacent to the DL grant, the location of the UL grant may mean a resource unit of a pre-designated location.

FIG. 9 illustrates the case in which the present embodiment is applied to DL signal transmission through a single antenna port (or layer).

Referring to FIG. 9(*a*), for example, when a PDSCH or PDSCHs are allocated to resource units except for a resource unit occupied by a DL grant among resource units of an RBG to be allocated to a UE by an eNB, the eNB may set an RA bit in the DL grant to 1 and transmit the DL grant to the UE through an e-PDCCH. Upon receiving the DL grant including the RA bit set to 1, the UE may recognize that the PDSCH(s) has been allocated to the resource units except for the resource unit occupied by the DL grant among the resource units in the allocated RBG. The UE may detect/acquire DCI by performing a signal processing procedure for restoring control information with respect to a signal received on the resource unit occupied by the DL grant among signals received on the allocated RBG and detect/acquire DL data by performing a signal processing procedure for restoring data with respect to signals received on the resource units except for the resource unit occupied by the DL grant. That is, when RA=1, the UE detects a DL data signal on a resource unit for a UL grant and, when RA=0, the UE detects the UL grant.

Referring to FIG. 9(*b*), for example, when a UL grant as well as a DL grant is allocated to resource units of an RBG to be allocated to the UE by the eNB, the eNB may set an RA bit in the DL grant to 0 and transmit the DL grant to the UE through an e-PDCCH. Upon receiving the DL grant including the RA bit set to 0, the UE may recognize that a PDSCH or PDSCHs have been allocated to resource units except for a resource unit occupied by the DL grant and a pre-designated resource unit occupied by the UL grant among the resource units in the RBG allocated to the UE. The UE may detect/acquire DL grant DCI by performing a signal processing procedure for restoring control information with respect to a signal received on the resource unit occupied by the DL grant among signals received on the allocated RBG, detect/acquire UL grant DCI by performing a signal processing procedure for restoring control information with respect to a signal received on the pre-designated resource unit occupied by the UL grant, and detect/acquire DL data by performing a signal processing procedure for restoring data with respect to signals received on resource units except for the resource unit occupied by the DL grant.

FIG. 10 illustrates the case in which the present embodiment is applied to DL signal transmission through a plurality of antenna ports (or layers) (i.e. DL signal transmission by spatial multiplexing). Particularly, in FIG. 10, the present embodiment is applied to single user MIMO (SU-MIMO) in which one UE uses all layers.

Referring to FIG. 10(*a*), when a DL grant of antenna port 0 (hereinafter, port 0) is detected and an RA bit in the DL grant is 1, in other words, when a DL grant transmitted through port 0 of the eNB is detected and the RA bit in the DL grant is 1, this means that PDSCHs have been allocated to resource units except for a resource unit of port 0 through which the DL grant has been detected and to resource units of the other ports (e.g. port 1). For robustness of the DL grant, a spatial multiplexing scheme may not be applied to transmission of the DL grant. When the spatial multiplexing scheme is not applied to transmission of the DL grant, a PDSCH is not mapped to a resource unit of port 1 corresponding to the resource unit of port 0 through which the DL grant has been detected (e.g. a resource unit occupying the same time-frequency resource as the resource unit of port 0 through which the DL grant has been detected) as illustrated in FIG. 10.

Meanwhile, referring to FIG. 10(*b*), when an RA bit in a DL grant is set to 0, this means that a UL grant is transmitted on a resource unit of a pre-designated location among resource regions allocated to the UE and PDSCHs are allocated to resource regions except for resource units occupied by the DL grant and the UL grant. Even in this case, for reliable detection of the DL/UL grant, the spatial multiplexing scheme may not be applied to transmission of the DL/UL grant. However, if multi-user MIMO (MU-MIMO) is applied to an e-PDCCH, an e-PDCCH of another UE may be present on a resource unit indicated by "no mapping" in FIGS. 10(*a*) and 10(*b*). Furthermore, when an e-PDCCH is transmitted through multiple layers, the e-PDCCH of a corresponding (SU-MIMO) UE may be transmitted/received on the resource unit indicated by "no mapping".

Figure 11:
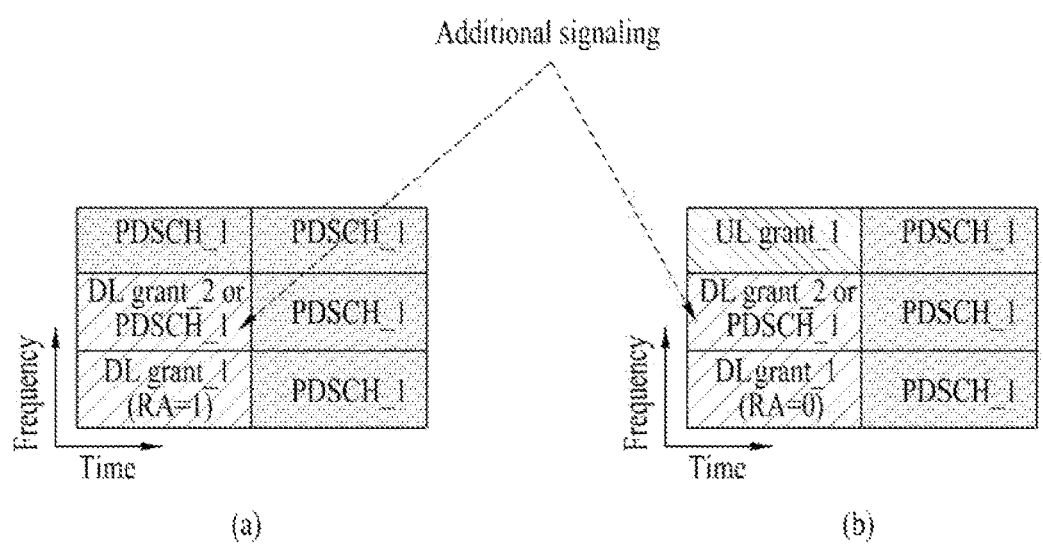
FIGS. 11 to 13 illustrate examples of resource assignment according to another embodiment of the present invention.
Figure 12:
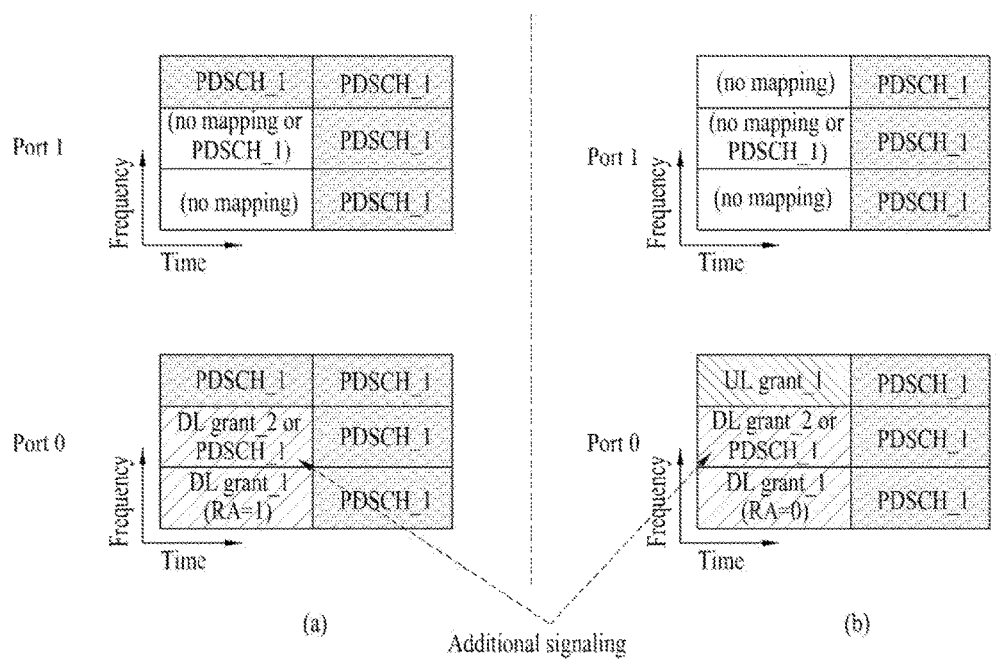
Figure 13:
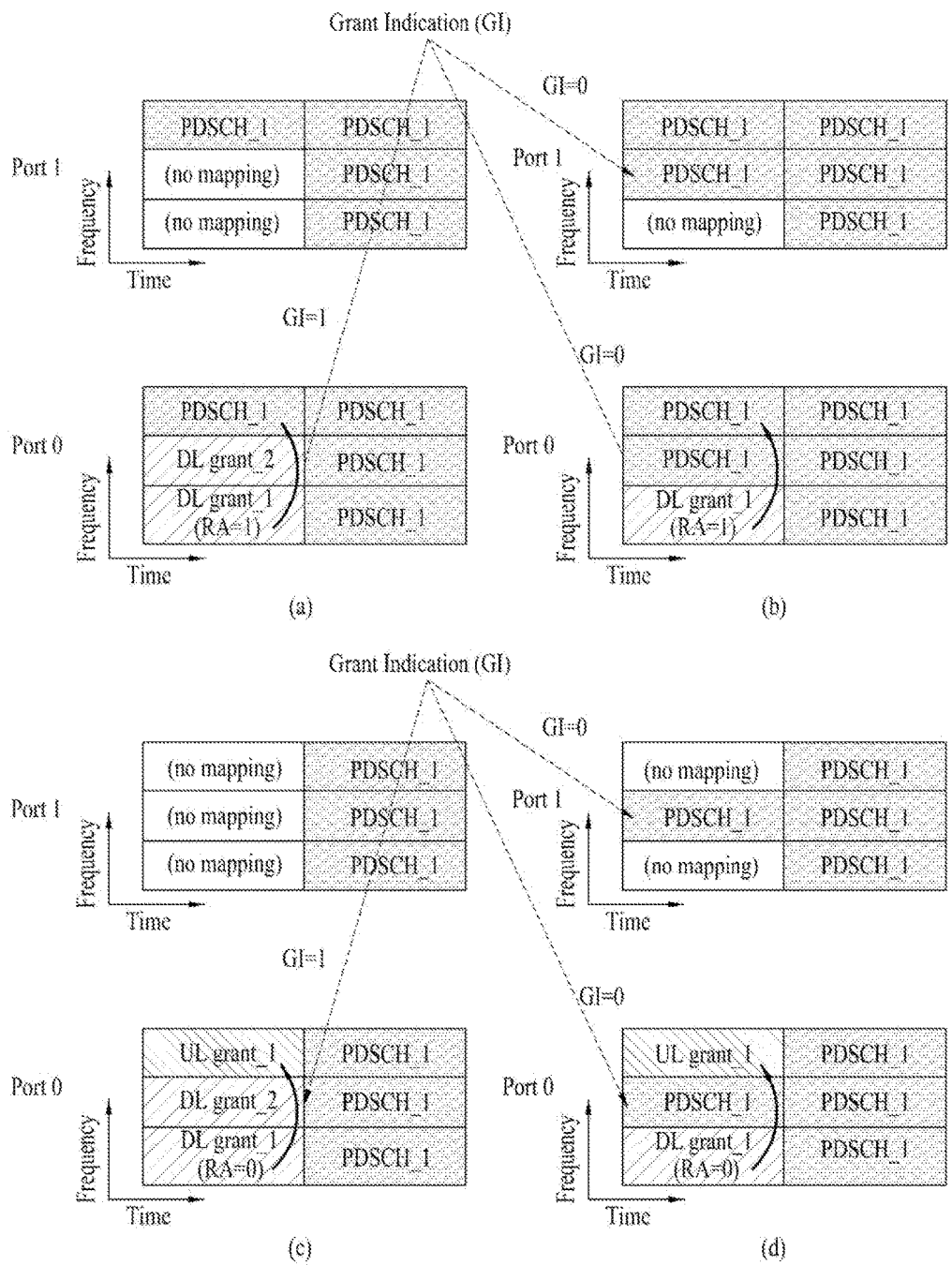

FIGS. 11 to 13 illustrate examples of resource assignment according to another embodiment of the present invention. The embodiment of FIGS. 11 to 13 proposes a method for transmitting a plurality of DL grants for multiple UEs in an RBG. Particularly, in FIG. 11, a plurality of DL grants allocated to an RBG is transmitted through a single layer/port and, in FIGS. 12 and 13, the embodiment of FIG. 11 is extended to a plurality of layers/ports.

Hereinafter, a method for interpreting an RA bit of each DL grant in an RBG by a UE and a method for assigning resources by a plurality of DL grants by an eNB will be described with reference to FIGS. 11 to 13. Hereinafter, a DL grant, a UL grant, and a PDSCH for UE i (where 1=1, 2, . . . ) will be referred to as DL grant_i, UL grant_i, and PDSCH_i, respectively. In this embodiment, it is assumed that the UE is aware of resource units available for transmission of a DL grants for another UE. The location of the DL grant for another UE may predefined as a resource unit adjacent to a resource unit occupied by a DL grant of the UE or may be semi-statically configured by the eNB to be pre-signaled to the UE.

The RA bit described with reference to FIGS. 9 and 10 may also be used in FIGS. 11 to 13. However, in the case in which DL grant_2 as well as DL grant_1 is transmitted in an RBG allocated to UE 1 by the eNB, UE 1 cannot be aware of whether DL grant_2 is present in the RBG allocated to UE 1 only by the RA bit. This is because the RA bit described in FIGS. 9 and 10 represents only the presence/absence of the UL grant of UE 1. When UE 1 does not know the presence of DL grant_2 and thus processes a signal received on a resource unit occupied by DL grant_2 as data, there is a high probability that UE 1 fails to decode PDSCH_1. Accordingly, in this embodiment, the eNB signals additional indication information indicating whether DL grant_2 is present to UE 1 so that UE 1 can be aware of the presence of DL grant_2. According to this embodiment, decoding performance of PDSCH_1 can be enhanced.

UE 1 may discern whether to demodulate data of PDSCH_1 from a signal received on a resource unit available for transmission of DL grant_2 according to the additional indication information. If the additional indication information indicates the presence of DL grant_2, UE 1 does not use a signal received on a resource unit indicated by "DL grant_1 or PDSCH_1" in FIG. 11 upon demodulating data. In contrast, if the additional indication information indicates the absence of DL grant_2, UE 1 demodulates data from the signal received on the resource unit indicated by "DL grant_1 or PDSCH_1" in FIG. 11.

In transmission of multiple layers/ports, a resource unit mapped to DL grant_1 in a specific layer/port may not be mapped to a PDSCH in another layer/port as illustrated in FIG. 12. However, as described with reference to FIG. 10, when MU-MIMO is applied to an e-PDCCH, an e-PDCCH of another UE may be present on a resource unit indicated by "no mapping". Further, when an e-PDCCH is transmitted through multiple layers, an e-PDCCH of UE 1 may be transmitted/received on the resource unit indicated by "no mapping". Moreover, although an interference problem between layers occurs, a PDSCH may be transmitted/received on the resource unit indicated by "no mapping".

If the additional indication information indicates that DL grant_2 is absent on a resource unit in an RBG, signals of PDSCH_1 may be transmitted/received on resource units of port 1 and port 2. Meanwhile, if the additional indication information indicates that DL grant_2 is mapped to a resource unit in an RBG, DL grant_2 may be transmitted/received on the resource unit of port 0 and no signals may be transmitted on the resource unit of port 1 as illustrated in FIG. 12. However, as described earlier, when MU-MIMO is applied to an e-PDCCH, an e-PDCCH of another UE may be mapped to a resource unit indicated by "no mapping or PDSCH_1" in FIG. 12 and, when an e-PDCCH is transmitted through multiple layers, DL grant_2 of UE 2 may be mapped to the resource unit indicated by "no mapping or PDSCH_1". If an interference problem between layers is disregarded, a PDSCH may also be mapped to the resource unit indicated by "no mapping or PDSCH_1".

FIG. 13 illustrates FIG. 12 in more detail. In FIG. 13, it is assumed that spatial multiplexing is not applied to a control channel (e.g. e-PDCCH) and spatial multiplexing is applied to a data channel (e.g. PDSCH). It is also assumed that port 0 among a plurality of ports of an eNB is used for transmission of the e-PDCCH.

In FIG. 13, a grant indication (GI) is signaling information indicating whether DL grant_2 is transmitted. The signaling information may be configured as an additional signal different from a conventional signal or may be configured by exclusively using a carrier indicator field (CIF) in a DCI format or other available fields. The CIF is a field used to indicate a type of CC of DCI. If the CIF in DCI indicates a CC other than a CC on which the DCI is detected, it is determined that the eNB has performed cross-carrier scheduling. The GI indicates whether a DL grant of another UE (e.g. DL grant_2) is present in an RBG in which a specific DL grant (e.g. DL grant_1) is transmitted/detected. For example, when the GI is 1, this may indicate that a DL grant of another UE is present in a corresponding RBG and, when GI is 0, this may indicate that a DL grant of another UE is not present in a corresponding RBG. Meanwhile, when an RB bit of a DL grant is set to 1, this means that a PDSCH is transmitted in a designated location and, when the RA bit of the DL grant is set to 0, this means that UL grant_1 is transmitted in a designated location.

A location at which the UE is to transmit/detect an RBG of a DL grant of the UE may be pre-designated. For example, UE 1 may pre-receive information about an SS in which DL grant_1 is to be decoded from the eNB.

Referring to FIG. 13(*a*), UE 1 receives/detects DL grant_1 on a resource unit for DL grant_1 in an RBG of port 0 and receives/detects a null signal on a resource unit for DL grant_1 in an RBG of port 1. That is, UE 1 may not detect a signal on the resource unit for DL grant_1 in the RBG of port 1 or, even when any signal is received, UE 1 may regard the signal as a noise/interference signal. Upon receiving a GI set to 1, UE 1 may recognize that DL frant_2 is present in an RBG allocated thereto and may not detect signals transmitted by port 0 and port 1 on a resource unit reserved or designated (hereinafter reserved/designated) for DL grant_2 or may regard the signals as noise/interference signals. If an RA bit included in DL grant_1 is set to 1, UE 1 may determine that a UL grant is absent in the RBG. Hence, upon receiving GI=1 and RA=1, UE 1 receives/detects signals of PDSCH_1 on resource units except for the resource units for DL grant_1 and DL grant_2 among resource units in the allocated RBG to demodulate data transmitted thereto by the eNB.

Referring to FIG. 13(b), UE 1 receives/detects DL grant_1 on a resource unit for DL grant_1 in an RBG of port 0 and receives/detects a null signal on a resource unit for DL grant_1 in an RBG of port 1. If an RA bit included in DL grant_1 is set to 1, UE 1 may determine that a UL grant is absent in the RBG. Upon receiving a GI set to 0, UE 1 may recognize that DL grant_2 is absent in the RBG allocated thereto. Accordingly, upon receiving GI=0 and RA=1, UE 1 receives/detects signals of PDSCH_1 on resource units except for the resource unit for DL grant_1 among resource units in the allocated RBG to demodulate data transmitted thereto by the eNB.

Referring to FIG. 13(c), UE 1 receives/detects DL grant_1 on a resource unit for DL grant_1 in an RBG of port 0 and receives/detects a null signal on a resource unit for DL grant_1 in an RBG of port 1. Upon receiving a GI set to 1, UE 1 may recognize that DL grant_2 is present in the RBG allocated thereto and may not detect signals transmitted by port 0 and port 1 on a resource unit reserved/designated for DL grant_2 or may regard the signals as noise/interference signals. If an RA bit included in DL grant_1 is 0, UE 1 determines that UL grant_1 is present in the RBG and may not detect signals transmitted by port 0 and port 1 on a resource unit reserved/designated for UL grant_1 or may regard the signals as noise/interference signals. Accordingly, upon receiving GI=1 and RA=0, UE 1 receives/detects signals of PDSCH_1 on resource units except for the resource units for DL grant_1, DL grant_2, and UL grant_1 among resource units in the allocated RBG to demodulate data transmitted thereto by the eNB.

Referring to FIG. 13(d), UE 1 receives/detects DL grant_1 on a resource unit for DL grant_1 in an RBG of port 0 and receives/detects a null signal on a resource unit for DL grant_1 in an RBG of port 1. Upon receiving a GI set to 0, UE 1 may recognize that DL grant_2 is absent in the RBG allocated thereto and that a signal of PDSCH_1 is transmitted on a resource unit reserved/designated for DL grant_2. If an RA bit included in DL grant_1 is 0, UE 1 determines that a UL grant is present in the RBG and may not detect signals transmitted by port 0 and port 1 on a resource unit reserved/designated for UL grant_1 or may regard the signals as noise/interference signals. Accordingly, upon receiving GI=0 and RA=0, UE 1 receives/detects signals of PDSCH_1 on resource units except for the resource units for DL grant_1 and UL grant_1 among resource units in the allocated RBG to demodulate data transmitted thereto by the eNB.

Figure 15:
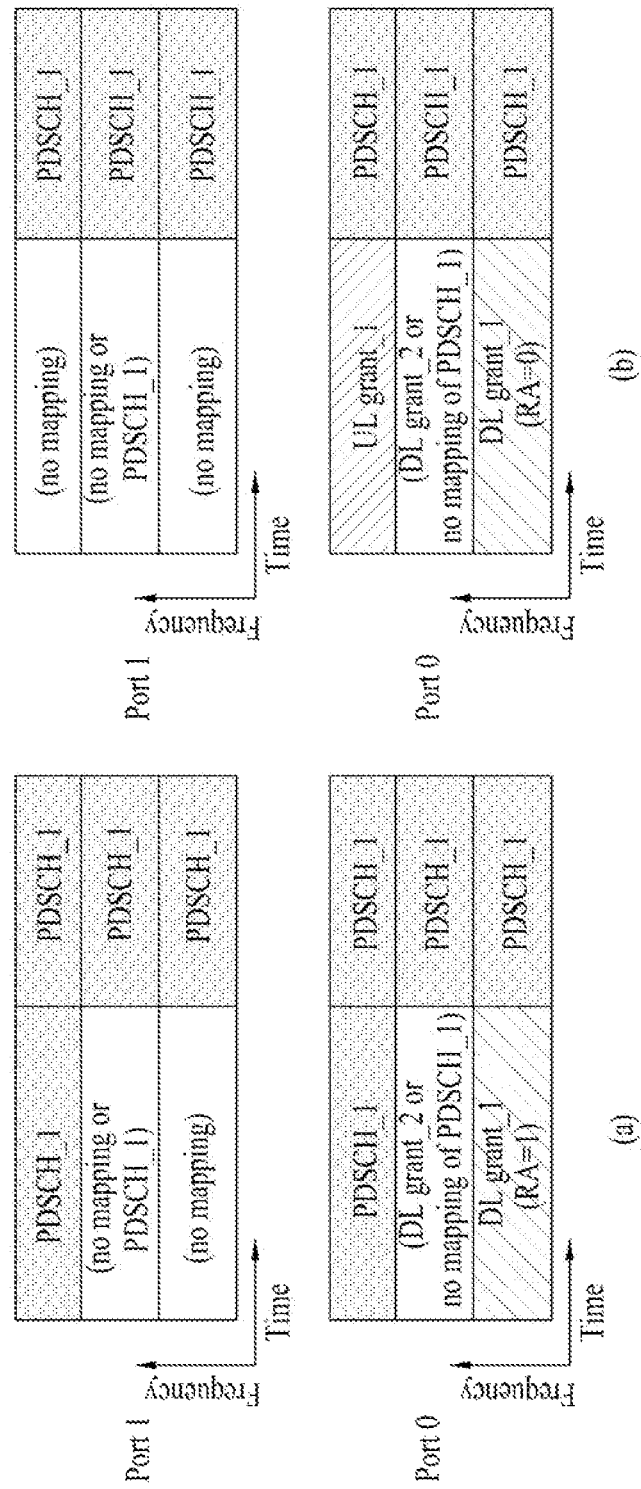

FIG. 14 and FIG. 15 illustrate examples of resource assignment according to still another embodiment of the present invention.

In the embodiment of FIGS. 14 and 15, a region in which DL grant_2 is transmitted (e.g. a DL grant SS) is always emptied irrespective of whether DL grant_2 is actually transmitted. That is, in the embodiment of FIGS. 14 and 15, a resource for DL grant_2 is reserved in a resource region allocated to the UE. In the embodiment of FIGS. 14 and 15, when the resource reserved for DL grant_2 is not actually used, that is, when DL grant_2 is not transmitted on the reserved resource, resource waste occurs. However, according to the embodiment of FIGS. 14 and 15, resource assignment of a UL grant or PDSCH_1 may be implicitly indicated only by the RA bit described with reference to FIGS. 9 and 10.

FIG. 14 illustrates an example in which the present embodiment for reserving a resource for DL grant_2 is applied to transmission of a single layer/port and FIG. 15 illustrates an example in which the present embodiment for reserving a resource for DL grant_2 is applied to transmission of multiple layers/ports.

Referring to FIG. 14, a signal received on a resource unit reserved for DL grant_2 is not used for data demodulation irrespective of whether DL grant_2 is actually transmitted. This is because the resource unit reserved for DL grant_2 is not used to transmit a PDSCH in this embodiment.

Referring to FIG. 15, since a time-frequency spatial resource reserved for a DL grant is emptied irrespective of whether the DL grant is actually transmitted in this embodiment. If DL grant_2 is not actually allocated, no signals are transmitted on a corresponding resource unit. In FIG. 15, spatial multiplexing, MU-MIMO, and multi-layer transmission are not applied. Referring to FIG. 15, for example, when DL grant_2 is actually allocated to a predetermined resource unit (indicated by "no mapping or PDSCH_1" in FIG. 14) of port 0, port 0 may transmit DL grant_2 to the UE using the predetermined resource unit and port 1 may transmit no signals on the predetermined resource unit. In other words, transmit power of the predetermined resource unit of port 1 is set to 0.

However, when spatial multiplexing is applied to this embodiment, DL grant_2 and PDSCH_1 may be multiplexed and transmitted on the predetermined resource unit. When MU-MIMO is applied to an e-PDCCH, a DL grant of another UE rather than DL grant_2 may be transmitted on the predetermined resource unit and, when multi-layer transmission is applied to the e-PDCCH, DL grant_2 may be transmitted through port 0 and port 1 on the predetermined resource unit. Similarly, according to whether spatial multiplexing, MU-MIMO, or multi-layer transmission is applied, port 1 may transmit a signal having transmit power of zero on a resource unit corresponding to a resource unit reserved/designated for DL grant_1 as illustrated in FIG. 15 or transmit a PDSCH or e-PDCCH.

FIGS. 9 to 15 illustrate the cases in which spatial multiplexing (multiplexing of the e-PDCCH and the e-PDCCH or multiplexing of the e-PDCCH and the PDSCH) is not performed upon the e-PDCCH. That is, in FIGS. 9 to 15, when the e-PDCCH is mapped to a resource unit of a specific port, no information/data is mapped to a corresponding resource unit of another port. However, spatial multiplexing of the e-PDCCH and the e-PDCCH or spatial multiplexing of the e-PDCCH and the PDSCH should be performed even when interference occurs between layers, it is desirable to pre-define a rule about spatial multiplexing.

Meanwhile, in order to decode some or all of a DL grant or a UL grant received through the e-PDCCH before the UE attempts to decode the PDSCH, an e-PDCCH DL grant and an e-PDCCH UL grant of the present invention may be restricted such that they are located only in the first slot. In this case, in FIGS. 9 to 15, three resource units located at the front part in the time domain may be interpreted as resource units located in the first slot of a DL subframe and three resource units located at the rear part in the time domain may be interpreted as resource units located in the second slot of the DL subframe.

Figure 16:
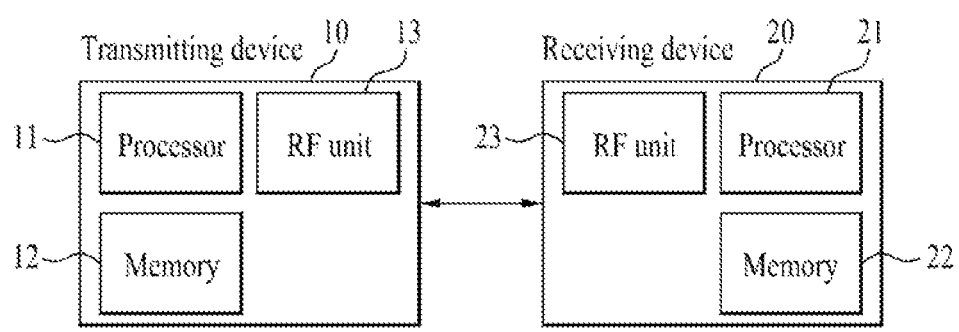
FIG. 16 is a block diagram illustrating elements of a transmitting device 10 and a receiving device 20 for implementing the present invention.

FIG. 16 is a block diagram illustrating elements of a transmitting device 10 and a receiving device 20 for implementing the present invention.

The transmitting device 10 and the receiving device 20 respectively include radio frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as a eNB processor, a eNB RF unit, and a eNB memory, respectively.

Figure 17:
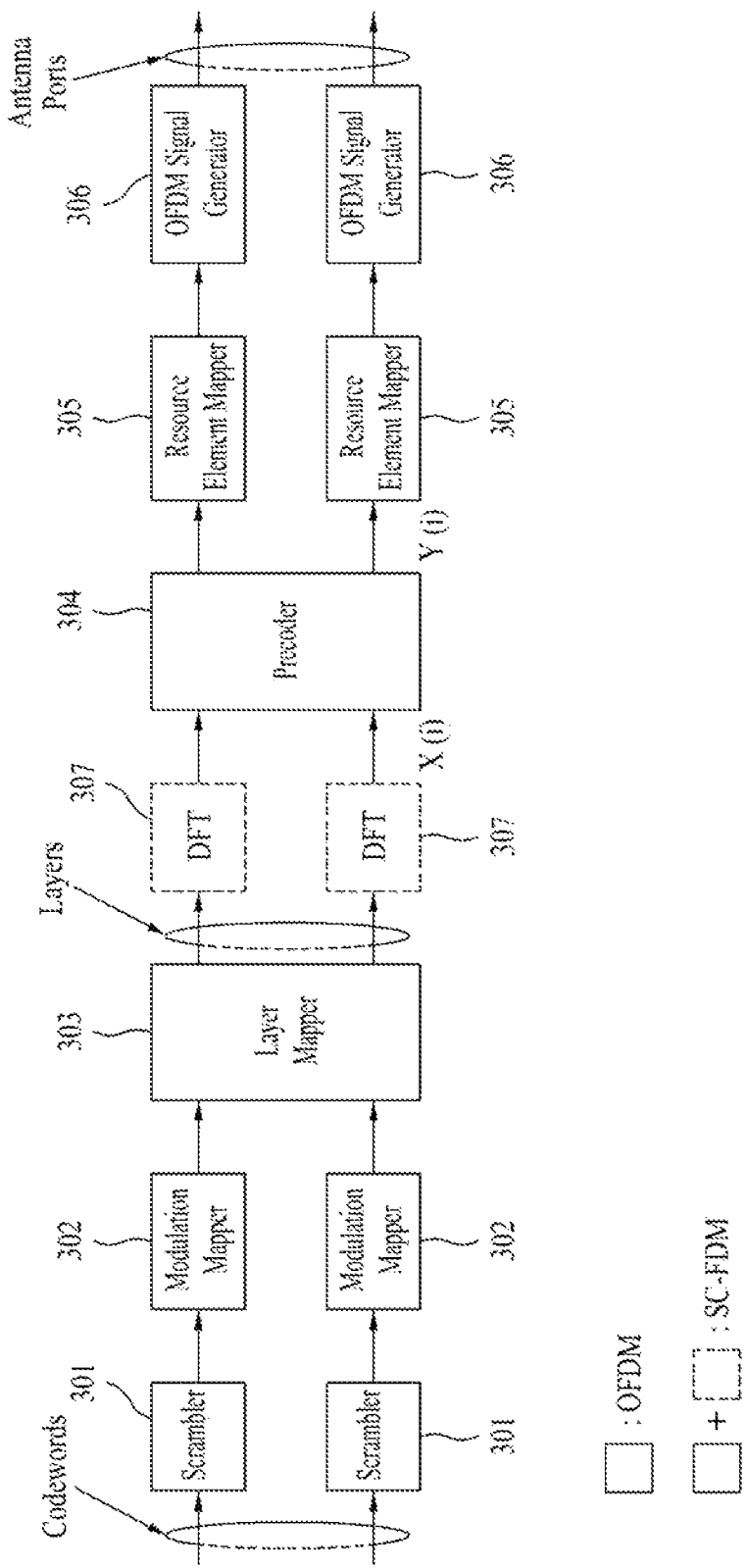
FIG. 17 is a block diagram of an exemplary transmitter in a transmitting device (10).

FIG. 17 is a block diagram of an exemplary transmitter in a transmitting device (10).

Referring to FIG. 17, the processor 11 in the transmitting device 100 may include channel encoders (not shown), scramblers 301, modulation mappers 302, a layer mapper 303, a precoder 304, resource element (RE) mappers 305, and OFDM signal generators 306.

The transmitting device 10 may include one or more channel encoders (not shown) for encoding UCI. The channel encoders may generate an encoded bit sequence by applying a (30,O) Reed-Muller (RM) code to the UCI. The transmitting device 10 may include a plurality of channel encoders for channel encoding of each of multiple segments obtained by segmenting the UCI.

The transmitting device 10 may transmit more than one codeword. The scramblers 301 scramble the coded bits of each codeword, for transmission on a physical channel. A codeword may be referred to as a data stream and is equivalent to a data block provided from a MAC layer. The data block provided from the MAC layer is referred to as a transport block.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-Phase Shift Keying (m-PSK) and m-quadrature amplitude modulation (m-QAM).

The layer mapper 303 maps the complex-valued modulation symbols to one or more transmission layers. Codeword-to-layer mapping may vary with transmission scheme.

In the present invention, an SC-FDM access (SC-FDMA) scheme is used for UCI transmission. When the SC-FDMA scheme is adopted for codeword transmission, the processor 11 of the transmitting device 10 may include conversion precoders. Discrete Fourier transform (DFT) modules 307 (or fast Fourier transform (FFT) modules) may be used as the conversion precoders. The conversion precoders generate complex-valued symbols by performing DFT or FFT (hereinafter, DFT/FFT) upon the complex-valued modulation symbols divided for mapping to each antenna port.

The precoder 304 may precode the complex-valued modulation symbols on each layer, for transmission through the antenna ports. More specifically, the precoder 304 generates antenna-specific symbols by processing the complex-valued modulation symbols for multiple transmission antennas according to a MIMO scheme, and distributes the antenna-specific symbols to the RE mappers 305. That is, the precoder 304 maps the transmission layer(s) to the antenna port(s). The precoder 304 may multiply an output x of the layer mapper 303 by an $N_t^*M_t$ precoding matrix W and output the resulting product in the form of an $N_t^*M_F$ matrix z. In the embodiments of the present invention, the precoder 304 may distribute the complex-values symbols received from one conversion precoder to one RE mapper associated with one antenna port.

The RE mappers 305 map/allocate the complex-valued modulation symbols for the respective antenna ports to REs. The RE mappers 305 may allocate the complex modulation symbols for the respective antenna ports to appropriate subcarriers, and may multiplex them according to users.

The OFDM signal generators 306 modulate the complex-valued modulation symbols for the respective antenna ports, that is, the antenna-specific symbols through OFDM or SC-FDM modulation, thereby producing a complex time-domain OFDM or SC-FDM symbol signal. The OFDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM signal generators 306 may include an IFFT module, a CP inserter, a Digital-to-Analog Converter (DAC), a frequency upconverter, etc.

The receiving device 20 operates in the reverse order to the operation of the transmitting device 10. Specifically, the processor 21 of the receiving device 20 decodes and demodulates radio signals received through the RF unit 23 from the outside. The RF unit 23 may include $N_r$ multiple reception antennas. Each signal received through the reception antennas is restored into a baseband signal and the original data stream transmitted by the transmitting device 10 is recovered through multiplexing and MIMO demodulation. The processor 21 may include a signal recoverer for recovering a baseband signal from a received signal, a multiplexer for multiplexing the received and processed signal, and a channel demodulator for demodulating the multiplexed signal stream into a codeword. The signal recoverer, the multiplexer, and the channel demodulator may be comprised of one integrated module or independent modules for performing respective functions. More specifically, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitting device 10 from the transmission layers.

Meanwhile, when the receiving device 20 receives signals transmitted by an SC-FDMA scheme, the processor 21 further includes an inverse discrete Fourier transmission (IFFT) module (or an inverse fast Fourier transform (IFFT) module). The IDFT/IFFT module IDFT/IFFT-processes the antenna-specific symbols recovered by the RE demapper and outputs the IDFT/IFFT symbol to the multiplexer.

For reference, while it has been described in FIG. 17 that the processor 11 of the transmitting device 10 includes the scramblers 301, the modulation mappers 302, the layer mapper 303, the precoder 304, the RE mappers 305, and the OFDM signal generators 306, it may be further contemplated that the RF unit 13 of the transmitting device 10 includes the above elements. Likewise, while it has been described in FIG. 17 that the processor 21 of the receiving device 20 includes the signal recoverer, the multiplexer, and the channel demodulator, it may be further contemplated that the RF unit 23 of the receiving device 20 includes the above elements.

In the afore-described embodiments of the present invention, the layer is obtained by demultiplexing, channel-coding, and modulating the data transmitted to the receiving device 20 by the transmitting device 10 and corresponds to an input path to the precoder. When the transmitting device 10 transmits signals using a plurality of layers, the receiving device 20 may demodulate a signal of each layer transmitted thereto using a DMRS per layer. Since the DMRS is used by a specific UE or a specific UE group rather than all UEs in a cell, the DMRS may also be called a UE-specific RS. In the case of a DL signal, the UE-specific RS is transmitted per layer or antenna port used for the DL signal. For example, upon transmitting a PDSCH through four layers, the eNB transmits the four layers together with four UE-specific RSs corresponding to the four layers one by one. Since a UE-specific RS transmitted to the UE by the eNB is precoded by the same precoder 304 together with a corresponding layer and then transmitted to the UE, the UE may demodulate a signal of the layer using the UE-specific RS. Although the mapping relationship between a layer and an antenna port varies with a precoding matrix configured by the precoder 304, the UE may distinguish between antenna ports of the eNB used to transmit a DL signal using UE-specific RS(s) or using UE-specific RS(s) and a channel measurement RS (e.g. a cell-specific RS (CRS) or a CSI-RS).

Referring to FIG. 16 and FIG. 17, according to the embodiments of the present invention, the eNB processor controls the eNB RF unit to transmit a PDCCH, an e-PDCCH, and/or a PDSCH and the UE processor controls the UE RF unit to receive the PDCCH, the e-PDCCH, and/or the PDSCH. According to the embodiments of the present invention, the UE processor controls the eNB RF unit to transmit a PUCCH and a PUSCH and the eNB processor controls the eNB RF unit to receive the PUCCH and the PUSCH.

The eNB processor may allocate a predetermined DL resource region to the UE and control the eNB RF unit to transmit a DL grant for the UE through the e-PDCCH. The eNB processor may configure a GI and/or an RA bit in the DL grant of the UE according to whether a UL grant and/or a DL grant of another UE is allocated to the allocated resource region. The eNB processor may control the eNB RF unit to transmit the GI and the RA bit. The eNB processor may control the eNB RF unit to transmit the RA bit through the e-PDCCH.

Under control of the UE processor, the UE RF unit may receive a signal carrying the GI and the RA bit transmitted by the eNB. The UE processor may detect the e-PDCCH carrying a DL grant in an SS of the UE and discern a resource region allocated to the UE based on the DL grant. In addition, the UE processor may recognize whether a UL grant is present in the allocated resource region based on the RA bit in the DL grant. The UE processor may discern whether a DL grant for another UE (hereinafter, another DL grant) is present in the allocated resource region based on the GI. When the UL grant and/or another DL grant is present in the allocated region, the UE processor may control the UE RF unit to receive a null signal on a time-frequency-spatial resource corresponding to the UL grant and/or another DL grant or process a signal received/detected on the time-frequency-spatial resource as an interference/noise signal. The UE processor may acquire DL data by demodulating signals received on resource units other than a resource unit on which the DL grant thereof is detected, a resource unit of another DL grant indicated to be present by the GI, and a resource unit of the UL grant indicated to be present by the RA bit, in the allocated resource region.

According to the embodiments of the present invention, a DL grant, a UL grant, and DL/UL grants of other UEs, transmitted on OFDM symbols other than the front OFDM symbols of a DL subframe, are easily distinguished from data by reusing an existing bit or adding a small-sized bit. Hence, according to the present invention, control information can be efficiently transmitted/received in a data region of the DL subframe.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, an RN, a UE, or other devices in a wireless communication system.

The invention claimed is:

1. A method for receiving, by a user equipment, a downlink data in a wireless communication system, the method comprising:
    receiving a first downlink grant for the downlink data through a first resource block (RB) among a plurality of RBs belonging to a resource block group (RBG) in a data region of a downlink subframe; and
    receiving the downlink data through first and second antenna ports according to resource assignment information in the first downlink grant,
    wherein the downlink subframe is divided into a control region and the downlink region in a time domain,
    wherein the resource assignment information in the first downlink grant includes a resource assignment (RA) bit indicating whether a second RB pre-designated for an uplink grant on the RBG contains the uplink grant or the downlink data, the second RB being different from the first RB,
    wherein the downlink data occupies the plurality of RBs except the first and second RBs on the RBG of both the first and second antenna ports while only the first and second RBs of the first antenna port contains the first downlink grant and the uplink grant, respectively, when the RA bit is set to a first value indicating that the second RB contains the uplink grant, and
    wherein the downlink data occupies the plurality of RBs except the first RB but including the second RB on the RBG of both the first and second antenna ports while only the first RB of the first antenna port contains the first downlink grant, when the RA bit is set to a second value indicating that the second RB does not contain the uplink grant.

2. The method according to claim 1, further comprising:
    receiving additional information indicating whether a second downlink grant of another user equipment is present on a third RB among the plurality of RBs,
    wherein the downlink data occupies the third RB when the additional information indicates that the second downlink grant is not present.

3. The method according to claim 2, further comprising:
    receiving the second downlink grant on the third RB when the additional information indicates that the second downlink grant is present,
    wherein the downlink data does not occupy the third RB in the first slot when the additional information indicates that the second downlink grant is present.

4. A user equipment for receiving a downlink data in a wireless communication system, the user equipment comprising:
    a radio frequency (RF) unit configured to transmit/receive a signal; and
    a processor configured to control the RF unit, the processor configured to:
    control the RF unit to receive a first downlink grant for the downlink data through a first resource block (RB) among a plurality of RBs belonging to a resource block group (RBG) in a data region of a downlink subframe; and
    control the RF unit to receive the downlink data through first and second antenna ports according to resource assignment information in the first downlink grant,
    wherein the downlink subframe is divided into a control region and the downlink region in a time domain,
    wherein the resource assignment information in the first downlink grant includes a resource assignment (RA) bit indicating whether a second RB pre-designated for an uplink grant on the RBG contains the uplink grant or the downlink data, the second RB being different from the first RB,
    wherein the downlink data occupies the plurality of RBs except the first and second RBs on the RBG of both the first and second antenna ports while only the first and second RBs of the first antenna port contains the first downlink grant and the uplink grant, respectively, when the RA bit is set to a first value indicating that the second RB contains the uplink grant, and
    wherein the downlink data occupies the plurality of RBs except the first RB but including the second RB on the RBG of both the first and second antenna ports while only the first RB of the first antenna port contains the first downlink grant, when the RA bit is set to a second value indicating that the second RB does not contain the uplink grant.

5. The user equipment according to claim 4, wherein the processor controls the RF unit to receive additional information indicating whether a second downlink grant of another user equipment is present on a third RB among the plurality of RBs, and
wherein the downlink data occupies the third RB when the additional information indicates that the second downlink grant is not present.

6. The user equipment according to claim 5, wherein the processor controls the RF unit to receive the second downlink grant on the third RB when the additional information indicates that the second downlink grant is present, and
wherein the downlink data does not occupy the third RB when the additional information indicates that the second downlink grant is present.

7. A method for transmitting, by a base station, a downlink data in a wireless communication system, the method comprising:
transmitting a first downlink grant for downlink data through a first resource block (RB) among a plurality of RBs belonging to a resource block group (RBG) to a user equipment in a data region of a downlink subframe; and
transmitting the downlink data through first and second antenna ports according to resource assignment information in the first downlink grant,
wherein the downlink subframe is divided into a control region and the downlink region in a time domain,
wherein the resource assignment information in the first downlink grant includes a resource assignment (RA) bit indicating whether a second RB pre-designated for an uplink grant on the RBG contains the uplink grant or of the downlink data, the second RB being different from the first RB,
wherein the downlink data occupies the plurality of RBs except the first and second RBs on the RBG of both the first and second antenna ports while only the first and second RBs of the first antenna port contains the first downlink grant and the uplink grant, respectively, when the RA bit is set to a first value indicating that the second RB contains the uplink grant, and
wherein the downlink data occupies the plurality of RBs except the first RB but including the second RB on the RBG of both the first and second antenna ports while only the first RB of the first antenna port contains the first downlink grant, when the RA bit is set to a second value indicating that the second RB does not contain the uplink grant.

8. The method according to claim 7, further comprising:
transmitting additional information indicating whether a second downlink grant of another user equipment is present on a third RB among the plurality of RBs,
wherein the downlink data occupies the third RB when the additional information indicates that the second downlink grant is not present.

9. The method according to claim 8, further comprising:
transmitting the second downlink grant on the third RB when the additional information indicates that the second downlink grant is present,
wherein the downlink data occupies the third RB when the additional information indicates that the second downlink grant is present.

10. A base station for transmitting a downlink signal in a wireless communication system, the base station comprising:
a radio frequency (RF) unit configured to transmit/receive a signal; and
a processor configured to control the RF unit, the processor configured to:
control the RF unit to transmit a first downlink grant for the downlink data through a first resource block (RB) among a plurality of RBs belonging to a resource block group (RBG) to the user equipment in a data region of a downlink subframe; and
control the RF unit to transmit the downlink data through first and second antenna ports according to resource assignment information in the first downlink,
wherein the downlink subframe is divided into a control region and the downlink region in a time domain,
wherein the resource assignment information in the first downlink grant includes a resource assignment (RA) bit indicating whether a second RB pre-designated for an uplink grant on the RBG contains the uplink grant or the downlink data, the second RB being different from the first RB,
wherein the downlink data occupies the plurality of RBs except the first and second RBs on the RBG of both the first and second antenna ports while only the first and second RBs of the first antenna port contains the first downlink grant and the uplink grant, respectively, when the RA bit is set to a first value indicating that the second RB contains the uplink grant, and
wherein the downlink data occupies the plurality of RBs except the first RB but including the second RB on the RBG of both the first and second antenna ports while only the first RB of the first antenna port contains the first downlink grant, when the RA bit is set to a second value indicating that the second RB does not contain the uplink grant.

11. The base station according to claim 10, wherein the processor controls the RF unit to transmit additional information indicating whether a second downlink grant of another user equipment is present on a third RB among the plurality of RBs, and
wherein the downlink data occupies the third RB when the additional information indicates that the second downlink grant is not present.

12. The base station according to claim 11, wherein the processor controls the RF unit to transmit the second downlink grant on the third RB when the additional information indicates that the second downlink grant is present, and
wherein the downlink data occupies the third RB when the additional information indicates that the second downlink grant is present.

* * * * *